May 23, 1939. B. V. ORRE 2,159,449
TEAT ELEMENT FOR MILKING MACHINES
Filed Aug. 24, 1937 2 Sheets-Sheet 1
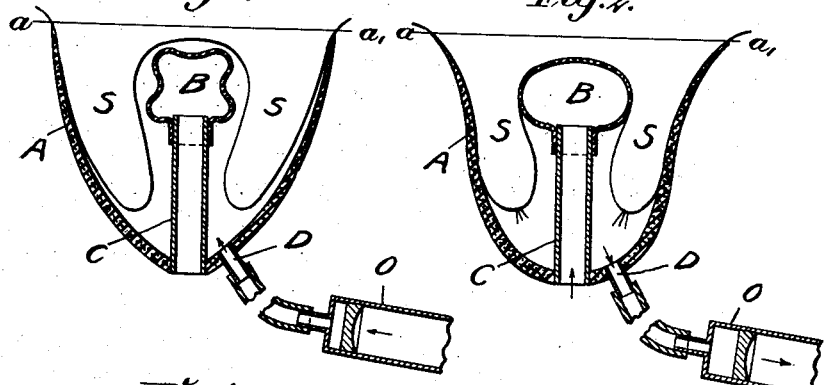
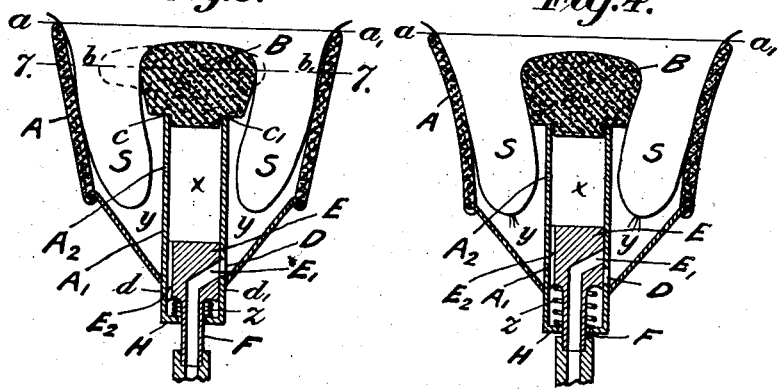
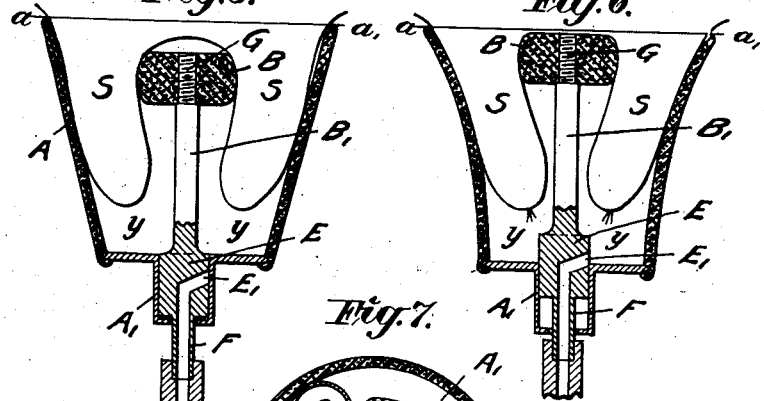
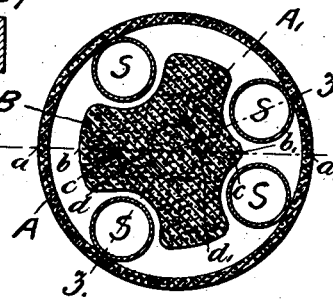
Inventor
Bernt V. Orre
By Sommers & Young
Attys

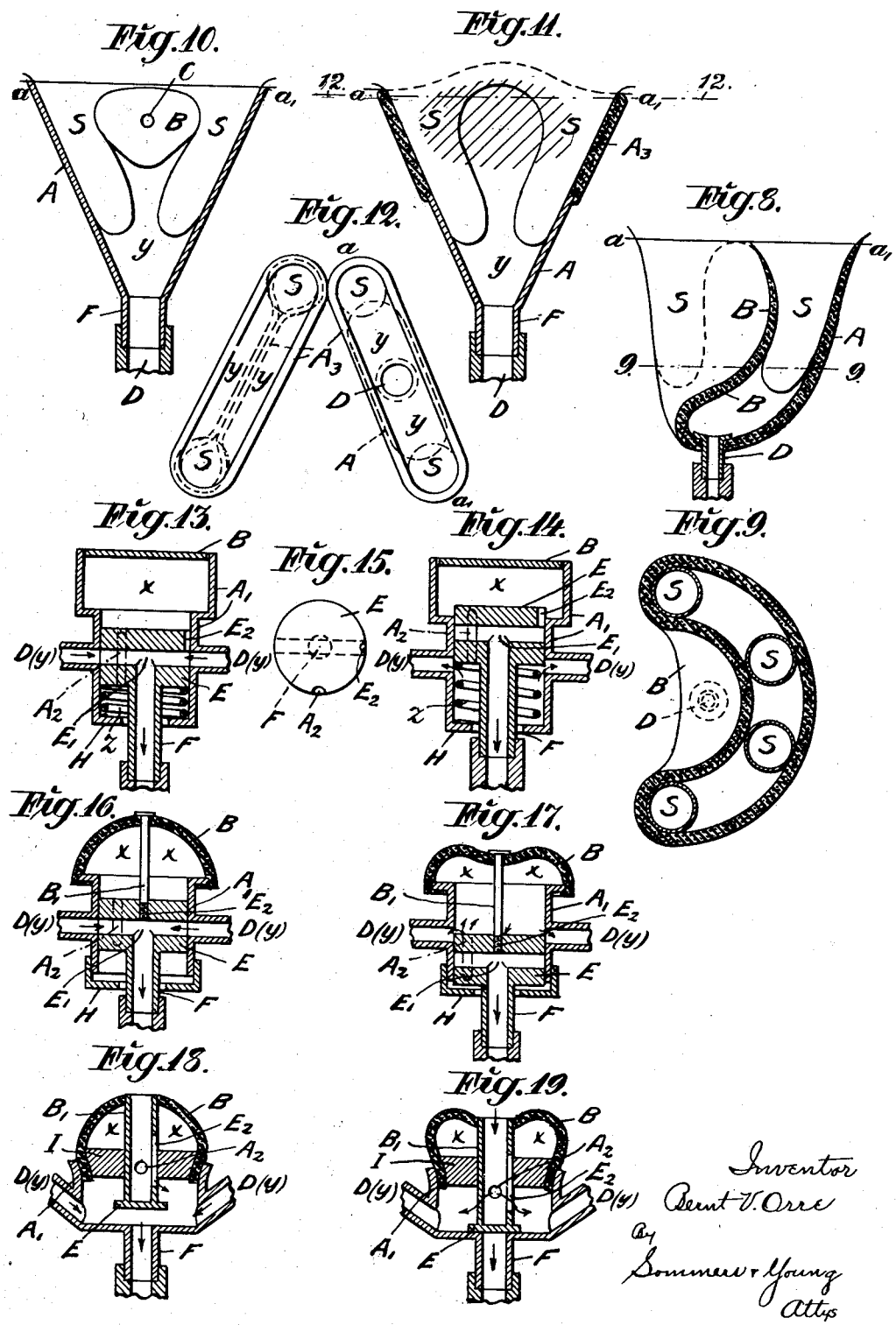

Patented May 23, 1939

2,159,449

UNITED STATES PATENT OFFICE 2,159,449

TEAT ELEMENT FOR MILKING MACHINES

Bernt Victor Orre, Stocksund, near Stockholm, Sweden

Application August 24, 1937, Serial No. 160,715
In Sweden August 26, 1936

11 Claims. (Cl. 31—84)

This invention relates to teat elements for milking machines which, in mechanical milking operations, perform the milking work proper, that is to say, the action on the teats.

The hitherto used teat elements for milking machines comprise, as a rule, four teat cups, one for each teat, connected, as by rubber tubings, to a collecting pipe as well as to mechanisms for effecting an intermittent rarefaction of the air. Two principal types are known: Primarily, single-wall, conical teat cups in communication with a single collecting pipe which in its turn is connected by a tubing to an individual plunger pump which during the reciprocation of the plunger acts to alternately evacuate the cups and fill them with air; secondly, double-wall teat cups connected by double tubings to a double collecting pipe which is in communication both with a common pump acting, as a rule, for several teat elements to produce a constant vacuum (generally 330-380 mm. column of mercury) and with mechanisms of various types for producing an intermittent rarefaction of the air.

These teat elements suffer from several imperfections and drawbacks. The operation involves a combination of suction and pressure, but is not physiologically correct. The calf's sucking action consists of a suction combined with a simultaneous pressure in a direction from the root of the teat towards the tip thereof. In addition, the calf by butting with its head against the udder of the cow exerts a massage of the udder involving a physiologic stimulus not immaterial for the function of the glands. It is true that in the single-wall type of teat cup, the pressure sets in at the same time as the suction, but this pressure acts in the direction away from the tip of the teat towards the root thereof so as to compress, substantially, the mouth of the teat inasmuch as the teat is jammed by being sucked down into the conical cup. It is thus seen that instead of cooperating with the suction, this pressure counteracts the milking action. In the double-wall type of teat cups the moment of pressure follows immediately upon the moment of suction and acts upon a more or less emptied teat, instead of cooperating with the suction for emptying a filled teat. The pressure has no direct physiological function even in this type of teat cups; its function being indirect, inasmuch as the pressure due to its compressing the elastic inner wall of the teat cup, has for its purpose to interrupt the suction on the teat during the pressure period. This interruption, however, is only illusory; even if the rubber lining closes itself completely below the teat which, as a rule, is not the case, the vacuum above the point of closing is still existing, as there is no admission of air of atmospheric pressure to the inside of the rubber lining where the teat is contained. The physiologically important massage of the udder is entirely missing in all teat elements having teat cups but occurs, on the other hand, in case of any good manual milking operation. Furthermore, the usual teat elements require a comparatively strong suction which is more strong than would be desirable from physiological and pathological point of view in order to cause the teat cups to adhere to the teats.

These inconveniences appearing at the teat elements now in use in connection with mechanical milking operations, explain why the machine milking, according to official tests, cannot for a prolonged period keep the milk secretion on a level with the manual milking process, is more disposed to render latent udder affections acute and, in spite of the simultaneous acting on all four teats, cannot empty the udder equally fast as a hand milker can, who only deals with two teats at the same time. In addition, these teat elements are comparatively complicated and difficult to maintain in a hygienically perfect state.

The present invention has for its object the elimination of the above said drawbacks by replacing for the teat elements hitherto used, that is, teat elements having a separate teat cup for each teat, a teat element having either a single udder cup to engage all four teats and the adjacent portions of the udder too, or a separate cup for the right hand half of the udder and another cup for the left hand half of the udder, said halves forming each a physiological unit, that is to say, an udder half cup, to engage the respective pair of teats and the adjacent portions of the udder.

In the accompanying drawings, Figs. 1—2, 3—4, 5—6 and 8, respectively, are vertical sectional views of four different embodiments of the invention, relating mainly to a form having a single udder cup. Figs. 7 and 9 are horizontal sectional views of Fig. 3 and Fig. 8, respectively. Figs. 10 and 11 are vertical sectional views of two different embodiments of udder half cups, Fig. 12 is a horizontal section on the line 12—12 of Fig. 11, and Figs. 13-19 show various means for effecting the pressure variations inside the udder cup or half cups.

A represents the udder cup or the udder half cup, B is a central body extending upwardly into between the teats on a level with the root thereof. S indicates the teats. D indicates an aperture for applying the vacuum and drawing the milk.

For the sake of clearness, the various embodiments of the invention having a single udder cup will be explained first.

The udder cup A, which is preferably slightly deeper than a normal teat, may be wholly or partially made from an elastic material. In the first-mentioned case its wall may, preferably, be thickened or otherwise stiffened downwards. In Figs. 3—4 the lower portion of the udder cup, which may be cup-shaped or flat, is made from a non-deformable material and provided with a rim to be attached to an upper portion, or collar, of an elastically deformable material. The central body may take various forms, provided it presents a contact surface, which may be convex, concave or plane, to engage the surface of the teats facing the center of the udder cup. Some embodiments are shown in Figs. 1–6 and 9, but, of course, still other forms may be used. The central body may be made from an elastic material or from a non-deformable material; it may be hollow and communicate with the atmospheric pressure (Figs. 1—2 and 13—14) or solid. It may be made deformable by assembling it from sections acted on by a centrally positioned wedge or cone. It may, preferably, be provided with radial upper projections bearing against the udder between each pair of teats (Figs. 3 and 7). The space between the wall of the udder cup and the central body should be sufficient to allow the teats to be easily inserted therein. The collar of the udder cup and the central body may, preferably, be detachably connected to the lower portion of the udder cup and may be of different sizes to accommodate different sizes of udders and positions of the teats.

In the embodiment according to Figs. 1 and 2 both the udder cup and the central body are made of an elastic material. The central body is hollow and communicates through pipe C with the atmosphere. As the udder cup A communicates through the tube nipple D with an individual plunger pump O of the kind usually employed in connection with single-wall teat cups, the udder cup is evacuated at the moment of plunger movement shown in Fig. 2, thereby subjecting the teats to a suction. The atmospheric pressure acting on the inside of the central body B tends to widen the latter so as to cause it to exert a pressure on the teats in the direction towards the periphery of the udder cup. At the same time the elastic rim of the udder cup is compressed so as to effect a counter pressure on the teats in the direction towards the central body. As a result, the milking action involves a simultaneous sucking and pressing action similar to the calf's sucking. The pressure commences in both cases at the root of the teat where it is also most strong, and continues at a decreasing strength towards the tip of the teat. In addition, the atmospheric pressure on the outside of the entire udder cup exerts a pressure on the udder both round the periphery $a-a_1$ of the cup and, by means of the central body, against the lower side of the udder between the teats, corresponding to an udder massage as effected by the calf. The milk flows in a well-known way to a container, not shown. During the return stroke of the pump plunger (Fig. 1), the atmospheric pressure is substantially restored within the udder cup, the pressure on the teats as exerted by the elastic wall of the udder cup and the central body being simultaneously eliminated, thereby allowing the teats to be filled with milk, whereupon the procedure will be repeated at the next plunger stroke.

It is not necessary, as far as the action of the teat element is concerned, that both the wall of the udder cup and the central body shall be deformable, but it is sufficient if only one of them acts to imitate the pressure action of the tongue in the calf's sucking, while the other member, that is, the wall of the udder cup or the central body, as the case may be, can play the passive part of the palate in the calf's sucking.

The udder cup instead of communicating with an individual plunger pump may be connected with a vacuum pump common to a number of teat elements which acts to generate a constant vacuum, as well as with a device for producing an intermittent vacuum, by which the udder cup is intermittently evacuated and again subjected to the atmospheric pressure.

As well-known devices of this kind, however, are as a rule very complicated and, in order to put them into communication with a milk conduit, must be provided with a special valve therein, the teat element is, preferably, so designed that the central body and its support in connection with the tube nipple for the applying of the suction and the withdrawal of the milk, will automatically render the application of the vacuum intermittent and effect the necessary variations in pressure. Two embodiments of this character are shown in Figs. 3—4 and 5—6, respectively.

In the embodiment shown in Figs. 3—4 the non-deformable lower portion of the udder cup A is provided with a central tube $A_1$ having at its bottom end an inwardly extending flange H. The top end of the tube is closed, as by the central body B, for which the tube forms a support. Immediately above the bottom of the udder cup the tube is apertured at D. The tube nipple F is extended upwards where it is formed as a plunger E reciprocating in the tube $A_1$ and is formed with a passage $E_1$ which continues the boring in the tubular nipple F. When the plunger or piston E is in its starting position (Fig. 3), the mouth of passage $E_1$ is in register with an aperture D in tube $A_1$. As the tube nipple F is in communication with a pump or other means for producing a constant vacuum, the rarefaction of the air takes place in space $y$ via passage $E_1$ and aperture D. The central body B is thus pressed against the lower surface of the udder and the elastic rim of the udder cup A will press the teats against the central body B. During this period the milk is drawn off from the teats. The space $y$ communicates with space $x$ through a narrow port $A_2$, and the plunger E is formed with a longitudinally extending channel $E_2$ or boring, of an area less than that of the port $A_2$, as for instance, half as large as the latter. The atmospheric pressure acts constantly in the space $x$ through channel $E_2$, and in the space $y$ too, through port $A_2$. Owing to the large area of port $A_2$ as compared with that of channel $E_2$, there will be produced within space $x$ after a certain period of time, a vacuum sufficient to lift the piston E up into the position shown in Fig. 4 resulting in an interruption of the communication between passage $E_1$ and aperture D. The rubber tubing connected to the nipple F acts as a stop member to prevent the piston E from being drawn by suction up into the tube $A_1$ to such a height as to close the port $A_2$. With the plunger in its uppermost position the evacuation of space $x$ now proceeds until the vacuums in spaces $y$ and $x$ balance each other. According as further air enters through channel $E_2$, the pressure will increase both in space $x$ and space $y$ substantially uniformly, until the piston E again falls into its starting position, thereby restoring the connection $E_1$—D. Milk is again withdrawn from the teats which have been filled in the preceding period of rest and the whole procedure is again repeated.

Instead of the channel $E_2$ in the plunger E there may be provided in the cup A an opening of such a small area that, in the closed position of the vacuum connection $E_1$—D, the admission of air through said opening is capable of restoring the atmospheric pressure in the spaces $y$ and $x$ after a given period of time.

By choosing for the tube nipple F a non-circular cross section and by giving the port in the lower portion of the pipe $A_1$ a form corresponding to the cross section of the nipple, the plunger E is prevented from rotating in such a way as to bring the mouth of passage $E_1$ out of register with port D. The starting position of plunger E may, preferably, be fixed by a spiral spring $z$, so that due to the compression of the spring, as by exerting a pull at the nipple F, the connection $E_1$—D and thus the suction in space $y$ will be interrupted. By means of a recess provided in the nipple the plunger E may after turning be fixed in said position.

Instead of allowing the atmospheric pressure to directly restore the plunger E to its starting position, as above described, the atmospheric pressure acting on the outside of the udder cup A may be utilized for the same purpose, as indicated in Figs. 5–6. The tube $A_1$ in this case extends only up to a level with the bottom of the udder cup, and the piston E is connected to the central body B by means of a shaft $B_1$. B may be connected, preferably by means of screw threads G or otherwise, to $B_1$ in a way permitting it to be lowered and raised, in order that the distance between B and F may be adjusted, within certain limits, to suit various sizes of udders and teats. The udder cup is put on the teats from below, as shown in Fig. 5. Then the tube nipple F is pressed upwards so that the mouth of passage $E_1$ projects above the bottom of cup A, to effect evacuation of space $y$ (Fig. 6). The plunger E is maintained in this position under the action of the atmospheric pressure on its under side around the nipple F. Due to the atmospheric pressure acting on the outside of the cup A, the latter, however, is pressed upwards against the udder, until the tube $A_1$ closes the mouth of passage $E_1$. The atmospheric pressure in space $y$ is substantially restored through a narrow aperture in the wall of the cup or a longitudinally extending channel in the plunger E, thereby allowing the cup A to again fall to the position shown in Fig. 5, whereas the central body B will be retained momentarily by the teats and, by the aid of shaft $B_1$, retains the plunger E, thereby again uncovering the mouth of passage E, and allowing space $y$ to be again evacuated, that is to say, the procedure is again repeated.

Figs. 8–9 illustrate another form of the invention in which the udder cup A and the central body B are formed as a single piece from a deformable material, the udder cup being substantially horseshoe-shaped and the central body open to allow lateral admission of atmospheric air.

If desired, both the udder cup and the udder half cup may be formed, wholly or partially, from a transparent material so as to allow observation of the action on the teats and the flow of milk as well.

The udder half cup differs from the udder cup mainly by the fact that it is, as a rule, flattened out on two sides, see the horizontal projection shown in Fig. 12. Figs. 1–2 and 5–6 may also be considered to represent vertical sections of the udder half cup taken along its greatest width, in which case, however, two udder half cups should be considered to be connected, as by a T-pipe or the like, with a common pump O or a common tubing leading to the milk collecting vessel.

As in the case of the udder cup, the udder half cup may be made, either wholly from a non-deformable material, as shown in Fig. 10, in which case it is provided with a preferably deformable central body which, if hollow, may be connected to the air by means of a nipple C inserted in the wall of the body, or wholly or partially from an elastic material, as described in connection with the description of the udder cup. In this case the central body, however, may be dispensed with (Figs. 11 and 12), because, when the cup is evacuated, its elastic walls $A_3$ will be compressed by the action of the atmospheric pressure, as indicated by the hatched area between the teats in Fig. 11, so as to fulfill the function of the separate central body due to its applying of the desired pressure to the teats, from the root towards the tip thereof, as well as to the udder, upwardly between the teats. No pressure on the tips of the teats is present, because the narrow vertical section of the cup, as a rule, is U-shaped.

Also the device shown in Figs. 3 and 4 for effecting the necessary variations of pressure in the cup may be utilized in connection with the udder half cup, without requiring any change. It is preferred, however, to use a single device of this kind for both udder half cups, yet with slight detail modifications, as determined by the fact that the device in this case is not placed in the intermittently evacuated cup, but outside thereof and between the two cups, connected thereto by means of short rubber tubings, ball joints, etc. Figs. 13–19 illustrate three different embodiments of said device. The device shown in Figs. 13–15 operates in the same way as described with reference to Figs. 3–4, except that the space $x$ is not in constant communication with the atmospheric pressure but with the vacuum by way of a narrow channel $E_2$ formed in the plunger E which extends from the passage $E_1$ to the top surface of the plunger, an intermittent connection with the atmospheric pressure being brought about by way of the somewhat wider channel $A_2$ extending from the lower surface of the plunger to adjacent the top surface thereof. Fig. 13 shows the starting position, as determined by the spring J. The arrows indicate the direction of the air flow. By way of the tubing nipples D the spaces $y$ of the cups are evacuated, and by way of the channel $E_2$ the space $x$ will be evacuated later, with the result that the plunger will be raised so as to interrupt the connection of the cups with the source of vacuum and allow the atmospheric pressure to enter below the plunger. At the same time the channel $A_2$ extends into the space $x$ so as to substantially restore the atmospheric pressure therein, thereby allowing the plunger E to again fall down to its starting position. Fig. 15 is a top plan view of the valve plunger E.

Instead of allowing the valve E to move upwards from its starting position by suction to effect the variations of pressure, it may be caused to effect the same variations of pressure by being pressed downwards from its starting point. To this end, the cover B, which corresponds to the central body of Figs. 3 and 4, may be formed as a piston reciprocating in space $x$ and connected with E by means of a spring, or it may be made from an elastic material and connected to E either by a spring or an inelastic shaft $B_1$ (Figs. 16—19).

In the embodiment of Figs. 16—17 the screw-threaded cover H forms an extension and end member of the boring of tube $A_1$ which is of a somewhat greater diameter than the latter. The channel $A_2$ in the plunger E extends from the top surface thereof to adjacent the lower end thereof. The channel $E_2$ for the constant application of vacuum to space $x$ may either be maintained or dispensed with, in which last mentioned case the port in the plunger E into which the shaft $B_1$ is threaded is extended down to the passage $E_1$. By this arrangement the supply of vacuum to space $x$ may be adjusted by screwing the shaft $B_1$ more or less inwards. As the area of the diaphragm B is larger than that of the plunger E, the latter will be pressed downwards as a result of an evacuation of space $x$, causing the channel $A_2$ to engage the threaded cover H and allowing the atmospheric pressure to enter space $x$ and nipples D, thereby restoring the plunger E to its starting position.

In the embodiment according to Figs. 18—19 the shaft $B_1$ is movable in a cover I which serves to attach the diaphragm B to the tube $A_1$. Formed on the outside of $B_1$ is a narrow, longitudinally extending channel admitting the vacuum from the nipple F to space $x$. The atmospheric pressure may either be constantly applied to the nipples D through a hole in tube $A_1$ which is of a somewhat larger area than that of the channel $E_2$ in shaft $B_1$ or, as shown in the drawings, $B_1$ may be hollow and connected at its upper end to the atmosphere and may be further provided with a radial opening $A_2$, likewise of a somewhat larger area than that of channel $E_2$. The valve piston E is replaced in this embodiment by a simple disc valve E. In the starting position, shown in Fig. 18, the opening $A_2$ is covered by the cover I; space $x$ is evacuated through channel $E_2$ and, as a result, valve E interrupts the supply of vacuum through tube nipple F and opening $A_2$ is uncovered. Atmospheric air now enters through this opening on the one hand to the tubing nipples D and on the other hand by way of channel $E_2$ to space $x$, and when the pressure in said last-mentioned space grows sufficiently high to balance the atmospheric pressure acting on the upper surface of valve disc E, the latter will be restored to its starting position.

It is thus seen that the present invention performs a physiologically correct milking operation by exerting a simultaneous downward pressure and a suction on the teats and, in addition, the invention effects a massage of the udder of high value, and these operations may be performed with the need of a considerably lower degree of suction than that necessary in hitherto used teat elements in order to cause said elements to adhere to the teats. This effect is obtained, in part, because of the larger suction area and, in part, owing to the fact that the teats are bent together by the action of the cup under the central body or the compressed collar so as to support the teat element. Furthermore, the teat element is applied to the teats by a simple manipulation and the suction may be automatically interrupted at the removal of the element. As a further advantage of the teat element according to the invention it may be noted that the teat element owing to its simple design in comparison with hitherto known elements may be easily maintained in a hygienic and cleanly state.

What I claim is:

1. A teat element for milking machines comprising an udder cup adapted to receive a plurality of teats at the same time, said cup possessing operating surfaces in contact with each individual teat at two opposite sides, at least one of said surfaces being deformable and adapted to act under the influence of a difference in pressure between the outside and the inside of the cup respectively, in order to compress the teat against the other surface.

2. A teat element for milking machines comprising two udder cups, one for the right hand half of the udder and another for the left hand half of the udder, each cup being adapted to subject the respective teats to the influence of an intermittent vacuum and to exert an intermittent pressure on the same.

3. A teat element for milking machines comprising a single udder cup adapted to engage all four teats at the same time, said cup being adapted to subject the teats to the influence of an intermittent vacuum and to exert an intermittent pressure thereon.

4. A teat element for milking machines comprising, in combination, two udder cups, one for each half of the udder, and a central body adapted to be placed between the teats.

5. A teat element for milking machines comprising, in combination, a single udder cup adapted to engage all four teats of the udder at the same time and a central body adapted to be placed between the teats.

6. A teat element for milking machines comprising, in combination, two udder cups, each adapted to engage one half of the udder, and a deformable central body adapted to be placed between the teats.

7. A teat element for milking machines comprising, in combination, two udder cups, each adapted to engage one half of the udder, and an elastic central body adapted to be placed between the teats, said body being hollow and having its inside in communication with the atmosphere.

8. A teat element for milking machines comprising, in combination, a single udder cup adapted to engage all four teats of the udder and an elastic central body adapted to be placed between the teats, said body being hollow and having its inside in communication with the atmosphere.

9. A teat element for milking machines comprising, in combination, an udder cup to engage a number of teats at the same time, said cup being deformable under the influence of differences in pressure acting on the inside and the outside of the cup, and a central body adapted to be placed between the teats.

10. A teat element for milking machines comprising an udder cup adapted to engage a number of teats at the same time, a chamber in communication with said cup and with the atmospheric pressure, and a valve body in said chamber adapted to effect alternate variations in the pressure acting on the teats.

11. A teat element for milking machines comprising an udder cup adapted to engage a number of teats at the same time, a chamber in communication with said cup and with the atmospheric pressure, and a valve body in said chamber adapted to effect alternate variations in the pressure acting on the teats, said valve body being so constructed and arranged as to also act as a tube nipple and as a stop cock for vacuum and milk.

BERNT VICTOR ORRE.